(12) United States Patent
Wang

(10) Patent No.: US 6,930,474 B2
(45) Date of Patent: Aug. 16, 2005

(54) CURRENT SENSE APPARATUS AND METHOD USING A COMBINATION OF A SIMULATION AND A REAL SENSE FOR A SWITCHING MODE POWER CONVERTER

(75) Inventor: Hung-I Wang, Changhua (TW)

(73) Assignee: Richtek Technology Corp., Hsinchu (TW)

( * ) Notice: Subject to any disclaimer, the term of this patent is extended or adjusted under 35 U.S.C. 154(b) by 118 days.

(21) Appl. No.: 10/653,078

(22) Filed: Sep. 3, 2003

(65) Prior Publication Data

US 2004/0056644 A1 Mar. 25, 2004

(30) Foreign Application Priority Data

Sep. 20, 2002 (TW) .......................... 91121805 A

(51) Int. Cl.[7] .............................................. G05F 1/618
(52) U.S. Cl. ...................... 323/288; 323/224; 323/271
(58) Field of Search ............................... 323/224, 225, 323/271, 288, 350, 351

(56) References Cited

U.S. PATENT DOCUMENTS

| | | | | |
|---|---|---|---|---|
| 5,111,133 A | * | 5/1992 | Poulo et al. ................. | 323/286 |
| 5,627,460 A | * | 5/1997 | Bazinet et al. .............. | 323/288 |
| 6,057,675 A | * | 5/2000 | Tateishi ....................... | 323/283 |
| 6,150,798 A | * | 11/2000 | Ferry et al. .................. | 323/273 |
| 6,246,220 B1 | * | 6/2001 | Isham et al. ................. | 323/224 |
| 6,377,032 B1 | * | 4/2002 | Andruzzi et al. ............ | 323/224 |
| 6,396,252 B1 | * | 5/2002 | Culpepper et al. .......... | 323/285 |
| 6,420,861 B2 | * | 7/2002 | Ochi et al. ................... | 323/288 |
| 6,583,610 B2 | * | 6/2003 | Groom et al. ............... | 323/288 |
| 6,707,281 B2 | * | 3/2004 | Solivan ....................... | 323/225 |
| RE38,487 E | * | 4/2004 | Isham et al. ................. | 323/224 |
| 6,791,306 B2 | * | 9/2004 | Walters et al. .............. | 323/288 |
| 6,813,173 B2 | * | 11/2004 | Lipcsei ........................ | 363/98 |

* cited by examiner

Primary Examiner—Jeffrey Sterrett
(74) Attorney, Agent, or Firm—Rosenberg, Klein & Lee

(57) ABSTRACT

In a switching mode DC-to-DC power converter including a high-side transistor connected between an input voltage and an output node, a low-side transistor connected between the output node and a reference potential, and an inductor connected to the output node to derive an output voltage and an output current, a current sense apparatus and method employs a ramp signal generator to generate a ramp signal with a slope proportional to the difference between the input and output voltages, a DC signal generator to generate a DC signal proportional to the DC component of the current through the low-side transistor, and a summing circuit for combining the ramp and DC signals.

14 Claims, 5 Drawing Sheets

US 6,930,474 B2

CURRENT SENSE APPARATUS AND METHOD USING A COMBINATION OF A SIMULATION AND A REAL SENSE FOR A SWITCHING MODE POWER CONVERTER

FIELD OF THE INVENTION

The present invention relates generally to a switching mode DC-to-DC power converter and, more particularly, to a current sense apparatus and method for a switching mode DC-to-DC power converter.

BACKGROUND OF THE INVENTION

Switching mode DC-to-DC power converters are widely used in power supply circuits, in which the currents of each phase are accurately sensed, and it is therefore very important to balance the currents between each phase. When a conventional switching mode DC-to-DC power converter desires to generate a current sense signal for the purpose of current balance thereof, typically it utilizes an external sense resistor, such as a power resistor of low resistance additionally connected in series, the conductive resistance of a power component, or the ESR (Equivalent Series Resistance) of an inductor or capacitor. FIG. 1 shows a conventional current sense apparatus 10 for one phase of a switching mode DC-to-DC power converter that has a high-side MOS 102 connected between a high voltage power supply $V_{in}$ and an output node 106, a low-side MOS 104 connected between the output node 106 and ground, an inductor 108 conected to the output node 106 to derive the output current $I_L$ and output voltage $V_o$, and both load capacitor 112 and resistor 114 connected to the converter output 116, and for the purpose of current sensing, a sense resistor 110 is inserted between the inductor 108 and converter output 116 for the output current $I_L$ to flow therethrough, in combination with an operational amplifier 118 to amplify the voltage drop across the sense resistor 110 to generate a current sense signal $V_{IS}$. However, a DC value proportional to the output current $I_L$ is generated from the DC value of the voltage drop across the sense resistor 110 and thereby introduces a regulation error to the output voltage. Moreover, due to the switching noise resulted from the parasitic noise element in the system, the SNR (Signal-to-Noise Ratio) is very low for the AC componant of the voltage drop across the sense resistor 110, and the error in the slope of the measured inductor current caused by this noise may result in unstability and failure to the power converter. In addition, the sense resistor 110 consumers electric power and subsequently reduces the efficiency of the converter.

In order to prevent a switching mode DC-to-DC power converter from the above-mentioned problems, an apparatus and method was proposed by U.S. Pat. No. 6,377,032 issued to Andruzzi et al., which simulates the current sense signal using three current sources to approximate or virtualize the real output current of the power converter. In detail, to generate the ripple of the simulated signal, a first current source proportional to the difference between the input and output voltages is used to charge a current sense capacitor to simulate the rising portion of the real signal, and a second current source proportional to the output voltage is used to discharge the current sense capacitor to simulate the falling portion of the real signal. Also, a third current source proportional to the output voltage is used to charge a ramp capacitor and a switch is used to control the charging and discharging of the ramp capacitor to generate a ramp waveform. The ripple and ramp waveforms are then combined to become the current sense signal that is approximately the inductor current of the power converter. However, this circuit is complicated and the current sense signal generated thereof has no physical meaning since it is a virtual signal or one obtained by way of simulations. It is therefore desired a current sense apparatus and method implemented by simpler circuit to generate the current sense signal almost as real as the output current of a switching mode DC-to-DC power converter.

SUMMARY OF THE INVENTION

An object of the present invention is to provide a current sense apparatus and method which generates a current sense signal nearly the same as the real output current for a switching mode DC-to-DC power converter.

Another object of the present invention is to provide a current sense apparatus and method using a combination of a simulation and a real sense for a switching mode DC-to-DC power converter which generates a current sense signal having physical meaning.

In a switching mode DC-to-DC power converter, according to the present invention, a high-side transistor is connected between an input voltage and an output node, a low-side transistor is connected between the output node and a reference potential, an inductor is connected to the output node to derive an output voltage and an output current, and a current sense apparatus and method which employs a DC signal generator to measure the current through the low-side transistor to generate a DC signal proportional to the DC componant of the current through the low-side transistor and a ramp signal generator to generate a ramp signal with a slope proportional to the difference between the input and output voltages. The ramp signal generator comprises a current source to generate a charging current proportional to the difference between the input and output voltages to charge a capacitor during each first half cycle of a clock to generate the ramp signal, and a summing circuit is used to combine the ramp and DC signals to generate the current sense signal.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
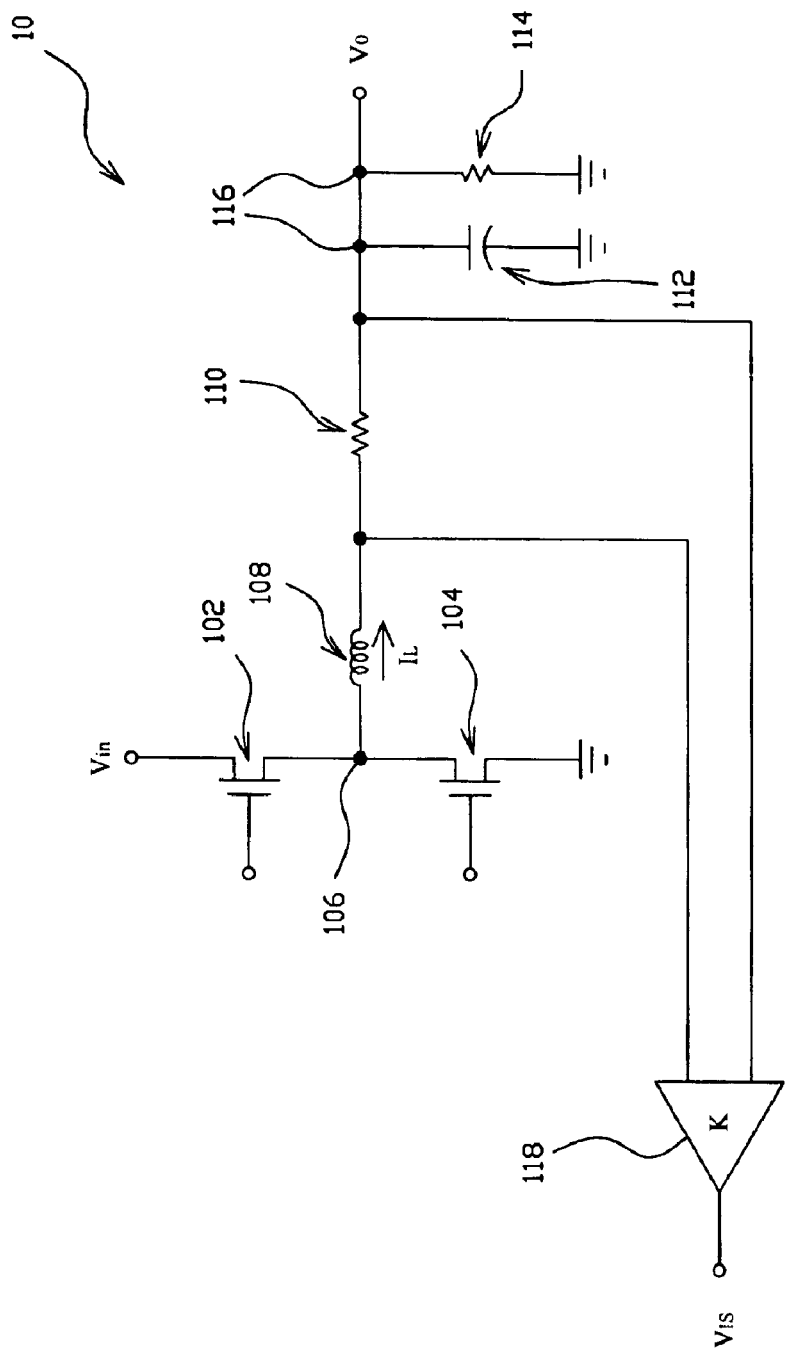
FIG. 1 is a schematic diagram of a conventional current sense apparatus.
Figure 2:
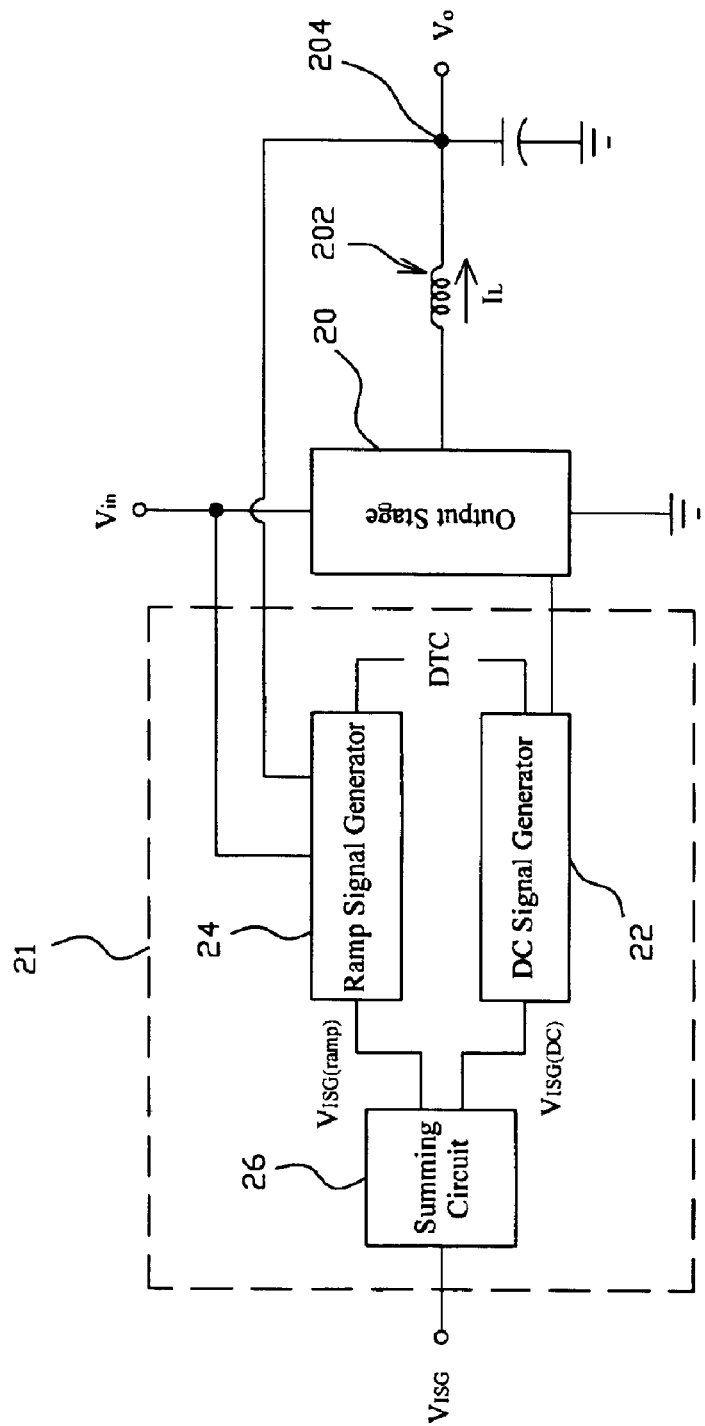
FIG. 2 is a block diagram of a current sense apparatus according to the present invention.

FIG. 2 shows a block diagram of a current sense apparatus according to the present invention. In a switching mode DC-to-DC power converter, an output stage 20 is connected between an input voltage $V_{in}$ and ground and provides an output current $I_L$ and output voltage $V_o$ from the converter output 204 through an inductor 202. In the current sense apparatus 21, a DC signal generator 22 receiving a clock DTC is connected to the output stage 20 to measure the output current $I_L$ from the output stage 20 to thereby generate a DC signal $V_{ISG(DC)}$ proportional to the DC component of the output current $I_L$, a ramp signal generator 24 also receiving the clock DTC is connected with the input voltage $V_{in}$ and output voltage $V_o$ to generate a ramp signal $V_{ISG(ramp)}$ with a slope proportional to the difference between the input voltage $V_{in}$ and output voltage $V_o$ during each first half cycle of the clock DTC, and a summing circuit 26 is connected with the DC signal generator 22 and ramp signal generator 24 to combine the ramp signal $V_{ISG(ramp)}$ and DC signal $V_{ISG(DC)}$ to thereby generate a current sense signal $V_{ISG}$ which will be approximating the output or inductor current $I_L$. The DC signal $V_{ISG(DC)}$ is the lower portion of the waveform 60 shown in FIG. 4, and is proportional to the DC component of the output current $I_L$ since it is obtained by measuring the output current $I_L$. Furthermore, it is known that the rising portion of the output current $I_L$ is proportional to the difference between the input voltage $V_{in}$ and output voltage $V_o$, and consequently, the rising portion of the output current $I_L$ can be simulated, as shown by the waveform 59 in FIG. 4. For signal control, it is not necessary to simulate the falling portion of the signal, so that there is no simulation circuit for the falling portion of the signal. As a result, both cost and complexity of the circuit are reduced. Moreover, since the DC component of the output current $I_L$ is directly measured, the signal has physical meaning.

Figure 3A:
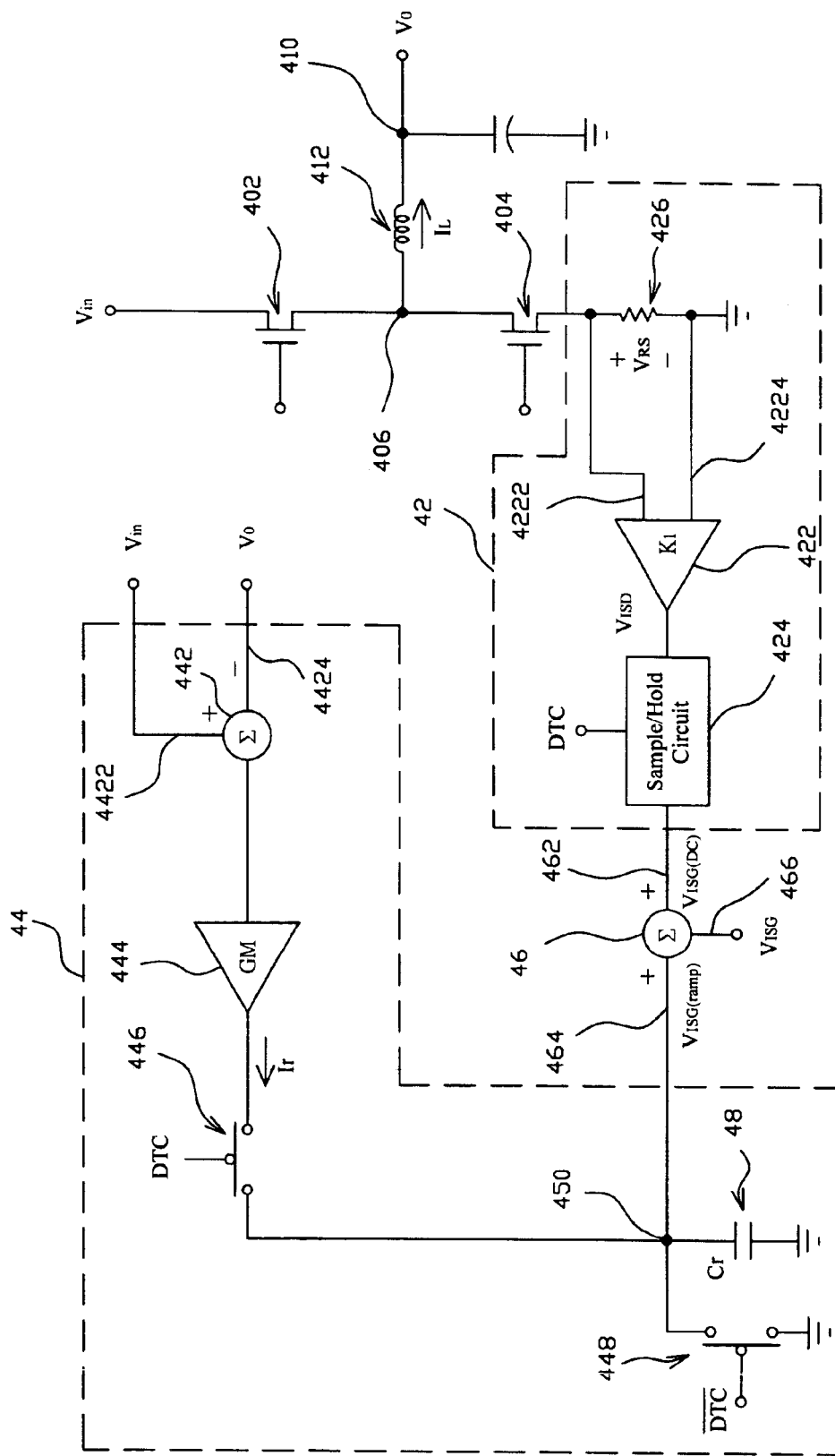
FIG. 3 shows an embodiment circuit of the current sense apparatus shown in FIG. 2.

FIG. 3A shows an embodiment circuit of the current sense apparatus of FIG. 2. The circuit comprises a high-side MOS 402 connected to the input voltage $V_{in}$ and a node 406, a low-side MOS 404 connected to the node 406, an inductor 412 connected between the node 406 and converter output 410, a DC signal generator 42 connected to the low-side MOS 404, a ramp signal generator 44 connected to the input voltage $V_{in}$ and output voltage $V_o$, and a summing circuit 46 with two positive inputs 462 and 464 connected to the DC signal generator 42 and ramp signal generator 44, respectively. The ramp signal generator 44 has a summing circuit 442 with a positive input 4422 connected to the input voltage $V_{in}$ and a negative input 4424 connected to the output voltage $V_o$ to generate the difference therebetween, a transconductive amplifier 444 to transform the difference to a charging current $I_r$ to charge a capacitor 48, a switch 446 arranged between the transconductive amplifier 444 and capacitor 48, and another switch 448 connected in parallel with the capacitor 48. The clock DTC is employed to control the switches 446 and 448, which connects the transconductive amplifier 444 to the capacitor 48 and opens the switch 448 during the first half cycles of the clock DTC for the charging current $I_r$ to charge the capacitor 48 to thereby generate the ramp signal $V_{ISG(ramp)}$ with a slope proportional to the difference ($V_{in}-V_o$) from an output node 450. During the last half cycles of the clock DTC, the clock DTC disconnects the connection between the transconductive amplifier 444 and capacitor 48 to stop charging the capacitor 48 and closes the switch 448 to discharge the capacitor 48 for its voltage down to 0 until the next cycle begines, as shown by the waveform 59 depicted in FIG. 4. From FIG. 3, the ramp signal $V_{ISG(ramp)}$ has the slope $SLP=I_r/C_r$, and $I_r=g_r(V_{in}-V_o)$, so that $SLP=g_r(V_{in}-V_o)/C_r$, where $C_r$ is the capacitance of the capacitor 48 and $g_r$ is the gain of the transconductive amplifier 444.

Figure 3B:
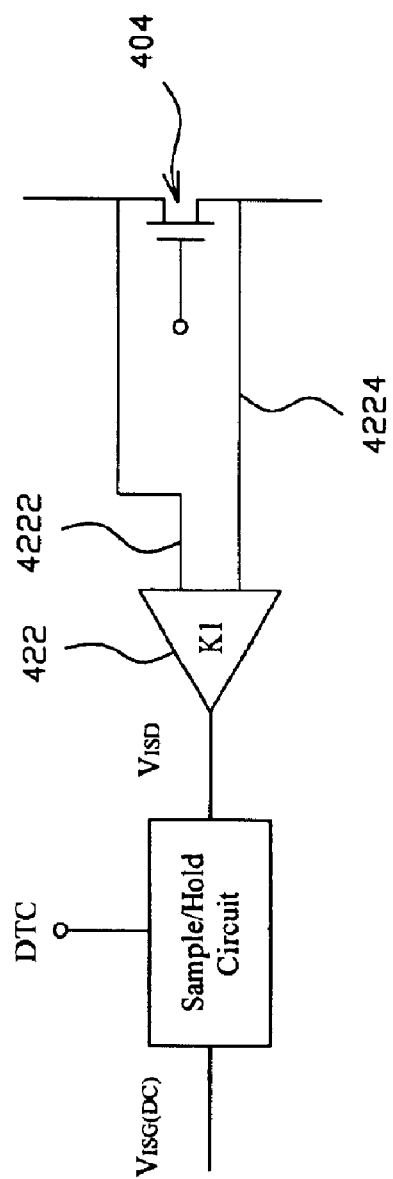

As shown in FIG. 3A, the DC signal generator 42 includes a measurement resistor 426 connected between the low-side MOS 404 and ground, an operational amplifier 422 serving as a measurement circuit to generate a measurement signal $V_{ISD}$ which is proportional to the current through the low-side MOS 404 by measuring the voltage drop across the measurement resistor 426, and a sample and hold circuit 424 receiving the clock DTC to record and sample the measurement signal $V_{ISD}$ at each end of the clock DTC to generate a DC signal $V_{ISG(DC)}$. FIG. 3B is another embodiment circuit of the DC signal generator 42, which also uses the operational amplifier 422 as the measurement circuit to generate the measurement signal $V_{ISD}$ for the sample and hold circuit 424 to generate the DC signal $V_{ISG(DC)}$. However, the circuit in FIG. 3B directly measures the voltage drop across the low-side MOS 404 to generate the measurement signal $V_{ISD}$, and in this case, the conductive resistance of the MOS 404 is used as the measurement resistor. Back to FIG. 3A, the DC signal $V_{ISG(DC)}=I_{L(DC)} \times RS_L \times K_1$, where $I_{L(DC)}$ is the DC component of the waveform 50 shown in FIG. 4, $RS_L$ is the resistance of the measurement resistor 426 in FIG. 3A, and $K_1$ is the gain of the operational amplifier 422. Finally, the summing circuit 46 combines the ramp signal $V_{ISG(ramp)}$ and DC signal $V_{ISG(DC)}$ to generate the current sense signal $V_{ISG}$ which will be approximating the waveform of the output current $I_L$.

Figure 4:
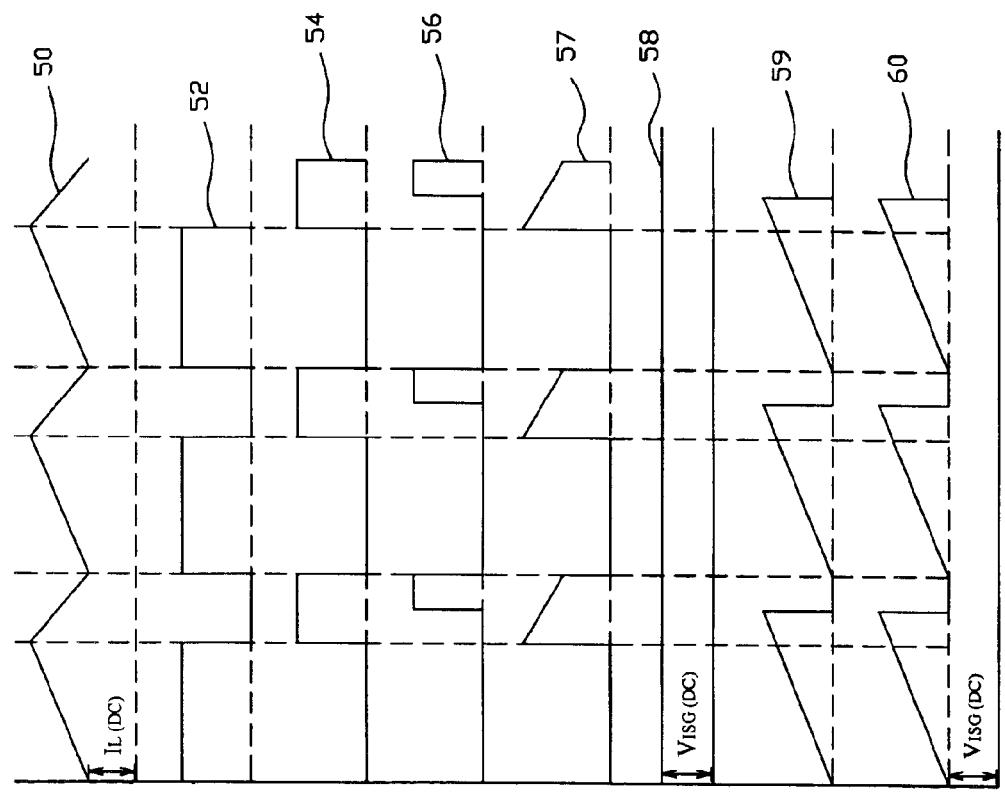
FIG. 4 is a timing diagram generated by the circuit of FIG. 3.

In FIG. 4, the waveform 50 represents the output current $I_L$ through the inductor 428 in FIG. 3A, the waveform 52 represents the control signal for the high-side MOS 402 in FIG. 3A, the waveform 54 represents the control signal for the low-side MOS 404 in FIG. 3A, the waveform 56 represents the clock DTC in FIG. 3A, the waveform 57 represents the signal $V_{ISD}$ outputted from the operation amplifier 422 in FIG. 3A, the waveform 58 represents the DC signal $V_{ISG(DC)}$ outputted from the sample and hold circuit 424 in FIG. 3A, the waveform 59 represents the ramp signal $V_{ISG(ramp)}$ in FIG. 3A, and the waveform 60 represents the current sense signal $V_{ISG}$ generated by the summing circuit 46. As it is described, the current sense signal $V_{ISG}$ is generated by the combination of the DC signal $V_{ISG(DC)}$ and ramp signal $V_{ISG(ramp)}$. The DC signal $V_{ISG(DC)}$ is obtained by measuring the current through the low-side MOS 404 and is thus a real sensed signal, instead of a simulated or virtual signal, i.e., it has physical meaning. On the other hand, even though the ramp signal $V_{ISG(ramp)}$ is generated by amplying the difference between the input voltage $V_{in}$ and output voltage $V_o$, it can be seen as an almost real signal as the output current $I_L$, since it is well-known that the slope of the output current $I_L$ is simply proportional to the difference between the input voltage $V_{in}$ and output voltage $V_o$. In addition, by the advanced priciple of the present invention, the current sense apparatus and method for a switching mode DC-to-DC power converter becomes much simpler.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A current sense apparatus using a combination of a simulation and a real sense for generating a current sense signal for a switching mode DC-to-DC power converter having a high-side transistor connected between an input voltage and an output node, and a low-side transistor connected between the output node and a reference potential, to provide an output voltage and an output current from the output node through an inductor, the apparatus comprising:

a ramp signal generator for generating a ramp signal with a slope proportional to a difference between the input and output voltages during each first half cycles of a clock;

a DC signal generator for generating a DC signal proportional to a DC component of a current through the low-side transistor by measuring the current through the low-side transistor; and a summing circuit for combining the ramp and DC signals to generate the current sense signal.

2. The apparatus of claim 1, wherein the ramp signal generator comprises:

a current source for providing a charging current; and a capacitive element charged by the charging current for generating the ramp signal.

3. The apparatus of claim 2, wherein the charging current is proportional to the difference.

4. The apparatus of claim 2, wherein the current source comprises:

a second summing circuit having a positive input connected with the input voltage and a negative input connected with the output voltage for generating the difference; and a transconductive amplifier for transforming the difference to the charging current.

5. The apparatus of claim 2, wherein the ramp signal generator further comprises a switch between the current source and capacitive element controlled by the clock for connecting the charging current to the capacitive element.

6. The apparatus of claim 1, wherein the DC signal generator comprises:

a resistive element connected between the low-side transistor and reference potential for generating a voltage drop;

a measurement circuit for generating a measurement signal from the voltage drop; and a sample and hold circuit for sampling and holding the measurement signal at each ends of the clock to generate the DC current signal.

7. The apparatus of claim 1, wherein the DC signal generator comprises:

a measurement circuit for generating a measurement signal from a voltage drop across the low-side transistor; and a sample and hold circuit for sampling and holding the measurement signal at each ends of the clock to generate the current signal.

8. A current sense method using a combination of a simulation and a real sense for generating a current sense signal for a switching mode DC-to-DC power converter having a high-side transistor connected between an input voltage and an output node, and a low-side transistor connected between the output node and a reference potential, to provide an output voltage and an output current from the output node through an inductor, the method comprising the steps of:

measuring a current through the low-side transistor for generating a signal proportional to a DC component of the current through the low-side transistor;

generating a ramp signal with a slope proportional to a difference between the input and output voltages during each first half cycles of a clock; and combining the ramp and DC signals for generating the current sense signal.

9. The method of claim 8, wherein the step of generating a ramp signal comprises charging a capacitive element by a charging current.

10. The method of claim 9, further comprising generating the charging current proportional to the difference between the input and output voltages.

11. The method of claim 10, wherein the generation of the charging current comprises:

subtracting the output voltage from the input voltage for generating the difference; and transforming the difference to the charging current.

12. The method of claim 9, further comprising using the clock to control the charging current to connect to the capacitive element.

13. The method of claim 8, wherein the generation of the DC current signal comprises:

arranging a resistive element between the low-side transistor and reference potential for generating a voltage drop;

generating a measurement signal from the voltage drop; and sampling and holding the measurement signal at each ends of the clock for generating the DC signal.

14. The method of claim 8, wherein the generation of the DC signal comprises:

measuring a voltage drop across the low-side transistor;

generating a measurement signal from the voltage drop; and sampling and holding the measurement signal at each ends of the clock for generating the DC signal.

* * * * *